Feb. 22, 1927.
G. O. WATSON
1,618,790
SHIP PROPULSION
Filed Oct. 30, 1923
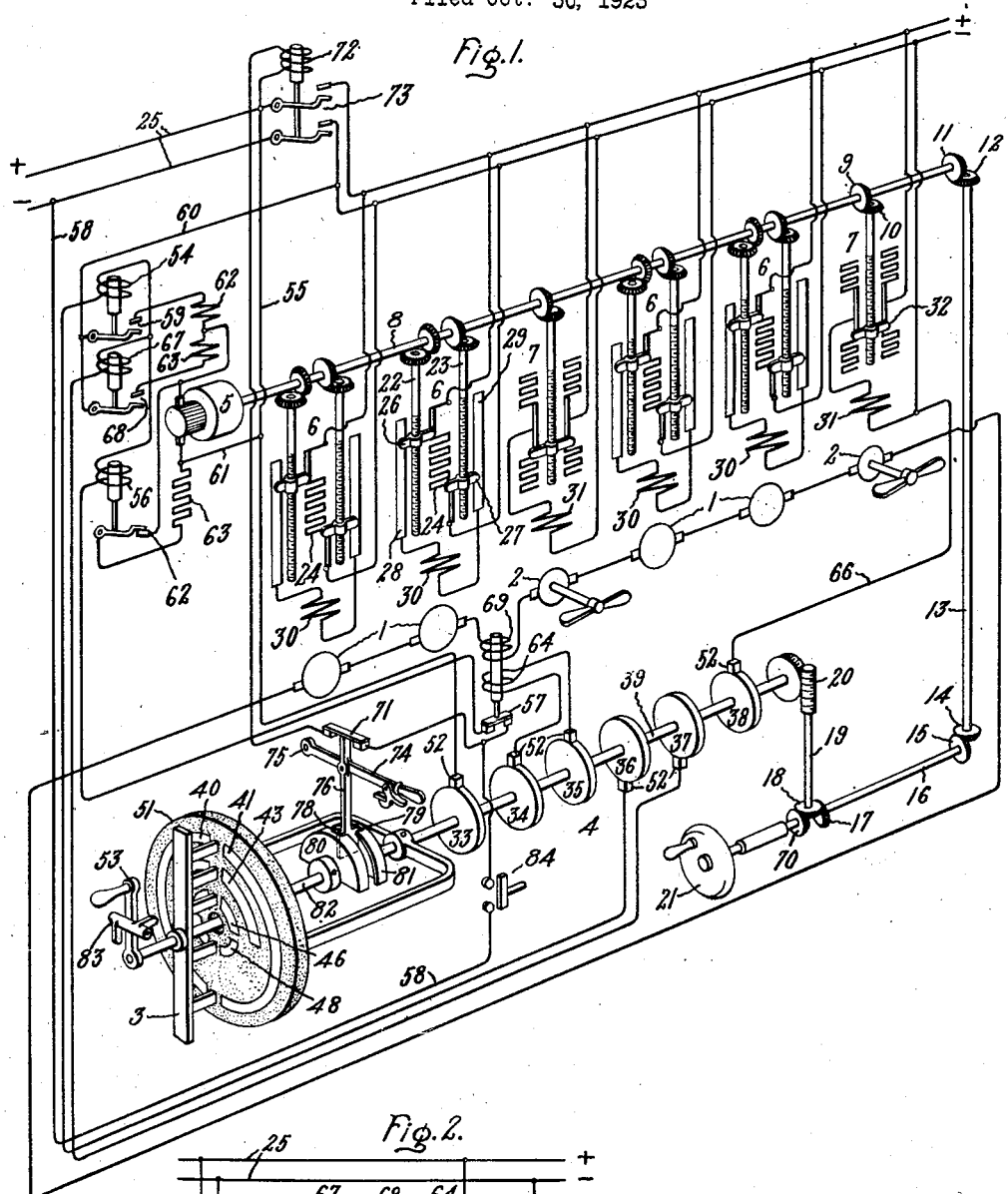
Inventor:
George O. Watson,
by Alexander S. Lunt
His Attorney Patented Feb. 22, 1927.

1,618,790

UNITED STATES PATENT OFFICE.

GEORGE O. WATSON, OF RUGBY, ENGLAND, ASSIGNOR TO GENERAL ELECTRIC COMPANY, A CORPORATION OF NEW YORK.

SHIP PROPULSION.

Application filed October 30, 1923, Serial No. 671,679, and in Great Britain November 10, 1922.

My invention relates to systems of electric ship propulsion of the type wherein a propeller is driven by a direct current motor supplied with current from one or more generators driven by prime movers such as Diesel engines or elastic fluid turbines, and has for its object the provision of means whereby the generator and propeller motor fields may be controlled in a simple, reliable and efficient manner.

In systems of this character it is customary to provide a master controller arranged to regulate the operation of a pilot motor mechanically coupled to reversible potentiometer rheostats which gradually varies the generator exciting current from zero to a maximum in either direction. According to my invention the rheostats for controlling the generator fields each comprise a resistance connected to a row of contacts having two contact faces over which two switch contacts are operated in opposite directions by a pilot motor. This motor is coupled to the follow-up device of a master controller which cuts out the motor when the rheostats have reached a position corresponding to the setting of the controller lever. A braking circuit is automatically made when the pilot motor is cut out whereby the motor becomes a braking generator and is quickly brought to rest. A handwheel is provided for manual operation in case of failure of the pilot motor. A control switch for operating a contactor through which current is supplied to the propeller motor and generator fields is so interlocked with the master controller as to prevent its being opened when either the controller lever or the controller segments are in running position for the pilot motor and to lock the controller drum and lever in place when the switch is open.

My invention will be better understood on reference to the following description when considered in connection with the accompanying drawing and its scope will be pointed out by the appended claims.

Referring now to the drawing, Fig. 1 shows a system in which my invention has been embodied, and Fig. 2 shows certain details of the connections between the controller lever contacts and the follow-up device.

Fig. 1 shows a plurality of direct current generators 1 connected in series with and arranged to supply current to propeller motors 2. A master controller comprising an arm 3 and follow-up device 4 are provided for controlling the operation of the pilot motor 5 which is operatively associated with generator field rheostats 6 and motor rheostats 7 through shaft 8 and bevel gears 9 and 10. The pilot motor 5 is also mechanically coupled to the follow-up device 4 through shaft 8, bevel gears 11 and 12, shaft 13, bevel gears 14 and 15, shaft 16, bevel gears 17 and 18, shaft 19 and worm 20. The follow-up device 4 is arranged to disconnect the pilot motor 5 from its source of current when the rheostats 6 and 7 have reached a position corresponding to the setting of the controller arm 3. A handwheel 21 is provided for manual operation of the rheostats 6 and 7 in case the pilot motor 5 should become inoperative.

Each of the generator rheostats 6 is provided with a resistance 24 connected across the line 25 and arranged to cooperate with contacts 26 and 27 threaded on the screws 22 and 23 respectively which are arranged to be driven from the shaft 8 through bevel gears 9 and 10. Contact bars 28 and 29 are connected to opposite terminals of the generator field windings 30. The arrangement of the bevel gears 9 and 10 on the shaft 8 is such that the two switch contacts 26 and 27 move in opposite directions so that voltage across the terminals of the generator fields can be built up from zero in the center position to a maximum at either of the extreme positions, the polarity depending on the direction in which the contacts are moved. With this construction of rheostat a large number of connecting leads between the contacts, and cross connections between opposite ends of the resistance are avoided, and the resistance is arranged in a single line of units behind the switch, connections being made direct from the contacts to the resistance terminals with a minimum of crossing leads.

The rheostats 7 of the propeller motor field windings 31 are so arranged that their resistance is normally short circuited until full potential is applied to the generator fields by the rheostats 6. When the rheostats 6 are in full field position, the contacts 32 of the rheostats 7 are in a position to insert resistance in the motor field circuits for the purpose of varying the motor field to compensate for a change in the number of generators operated and also to compensate for heating of the motor field winding.

The master controller comprises six disks 33 to 38 inclusive attached to and insulated from a shaft 39 which is driven by the pilot motor 5 as previously explained. These segments 33 to 38 are arranged to collect current from contact plates 40 to 48 inclusive carried by insulation disk 51 mounted to revolve with the shaft 39. Brushes 52 are arranged to cooperate with the disks 33 to 38. A switch arm 3 having an operating lever 53 is provided with fingers arranged to make contact with the segments 40 to 48. The contact fingers on each end of the arm 3 are conductively associated with each other but are insulated from the contacts at the opposite end thereof. When the operating arm 3 is moved in a counterclockwise direction, current from the source 25 is supplied to the pilot motor control switch operating coil 54 through conductor 55, disk 33, contact plates 45 and 42 which are interconnected through the contact fingers on the controller arm 3, disk 36, brake coil 56, contacts of overload relay 57 having shunt coil 64 and series coil 69 and conductor 58. Upon energization of the coil 54 the switch 59 is closed and the motor 5 is connected to the source 25 through conductor 60, switch 59, and conductors 61 and 55. The motor 5 is provided with oppositely wound field coils 62 and 63. With the connections just described the motor 5 is connected to the source 25 in series with the field coil 62 and is set in motion to operate the rheostats 6 and 7 as previously explained until the space between the contact plates 40 and 41 is brought into alinement with the contact fingers mounted on the controller arm 3 when the switch coil 54 will be disconnected from the source 25 and the switch 59 will be opened thereby disconnecting the motor 5 from the source 25. At the same time the coil 56 is deenergized and the switch 62 which is biased to closed position is closed to connect the braking resistance 63 across the armature of the motor 5. Movement of the controller lever in a counterclockwise direction also connects the shunt coil 64 of the overload relay 57 to the source of current 25 through conductor 55, disk 33, contact plates 45 and 40 which are interconnected through the fingers on the lever 3, disks 34 and 35, contact plates 41 and 48 which are interconnected through fingers on the lever 3, contact plate 47, conductor 65, disk 38 and conductor 66. Movement of the lever 3 in a clockwise direction connects the motor 5 to the source 25 for rotation in the opposite direction. Under these conditions the switch operating coil 67 is energized, the switch 68 is closed, and the field winding 63 is connected in series with the motor armature. The connections through which these results are brought about will be apparent from what has been said previously. While the brake coil 56 is illustrated as connected in series with the switch operating coils 54 and 67 it may obviously be connected in parallel with these coils if desired.

The handwheel 21 which is provided for manual operation of the rheostats 6 and 7, is arranged to be declutched when not in use. This is accomplished by simply pulling the hand wheel 21 to the left and disengaging the miter gears 18 and 70.

A switch 71 is provided for controlling energization of the operating coil 72 of the two pole switch 73 through which exciting current is supplied from the source 25 to the rheostats 6 and 7. This switch comprises a lever 74 pivoted at 75 and provided with a depending portion 76 the enlarged end of which is arranged to cooperate with slots 78 and 79 in the flanged peripheries of disks 80 and 81 mounted on the shafts 82 and 39 respectively. By this interlocking arrangement disconnection of the rheostats 6 and 7 from the source 25 when the arm 3 is in other than a position to disconnect the motor 5 from the source 25 is prevented. Conversely when the switch 71 is open the arm 3 cannot be operated to energize the motor 5.

The operating lever 53 is provided with a stop 83 for preventing the operator from throwing this lever from full ahead position to full astern position without first bringing the lever to rest in the illustrated stop position. This stop comprises a pivoted portion having two levers projecting at right angles to the pivot and to each other as shown. A spring may be provided for retaining the stop in the position to which it is moved. An interlock 84 arranged to be operated in response to movement of the governor of the prime mover may be provided if desired.

Assuming the generators 1 to be rotating at a suitable speed and the connections to be as illustrated in the drawing, the ship may be started in the ahead direction from rest by moving the controller lever 53 in a counterclockwise direction to a position determined by the speed desired, thus bringing the contact fingers mounted on the arm 3 into engagement with certain of the contact plates mounted on the insulation disk 51 as previously explained and establishing connections whereby the pilot motor 5 is set in motion to move the contact members 26 and 27 in opposite directions thereby increasing the voltage applied to the generator fields. Under these conditions the follow-up device 4 is rotated in a counterclockwise direction until the contact fingers on controller arm 3 are brought into alinement with the space between contact plates 40 and 41, thereby disconnecting the pilot motor from its source of current at a motor speed determined by the setting of the controller arm 3. Should it be desired to increase further the speed of the ship the arm 3 may be moved still further in a counterclockwise direction to a position determined by the speed desired, thereby connecting the pilot motor 5 for operation as described above. The ship may be brought to rest by moving the controller lever 53 into contact with the stop 83 provided for the purpose of stopping the lever in a position to stop the ship. If it is desired to accelerate the ship in the opposite direction the stop 83 must be rotated to permit movement of the lever 53 past it in a clockwise direction, thereby operating the rheostats 6 in a manner to reverse the polarity of the generator field winding and increase the voltage impressed thereupon. In order to bring the ship to rest from operation in the astern position the controller lever 53 is moved into contact with the stop 83, thereby causing the generator field voltage to be reduced to zero and the pilot motor circuit to be broken by rotation of the follow-up device. To permit further movement of the arm 3 in a counterclockwise direction the stop 83 must again be rotated as previously described. The overload relay 57 is provided for the purpose of interrupting the pilot motor circuit in case of excessive load upon the generators and serves to prevent further increase in the generator field voltage until the generator load current has assumed a safe value, but does not prevent a decrease in this voltage by movement of the arm 3 in the reverse direction.

I have explained my invention by illustrating and describing a certain specific embodiment thereof, but it will be readily understood by those skilled in the art that the invention may be embodied in many other forms than that shown and described. I, accordingly, do not wish to be restricted to the particular form or construction disclosed herein by way of example for the purpose of setting forth my invention in accordance with the patent statutes. The terms of the appended claims are, therefore, not restricted to the precise structure disclosed, but are intended to cover all changes and modifications within the spirit and scope of my invention.

What I claim as new and desire to secure by Letters Patent of the United States, is,—

1. A system of electric ship propulsion wherein current is supplied to a propeller motor from a direct current generator provided with a field rheostat arranged to be connected to a source of current for controlling its excitation and wherein energization of a pilot motor for operating said rheostat is controlled by a master controller having manually operated means for starting and a follow-up device for stopping said pilot motor, comprising means operable only when said master controller is in off position for disconnecting said rheostat from said source.

2. A system of electric ship propulsion wherein current is supplied to a propeller motor from a direct current generator provided with a field rheostat arranged to be connected across a source of current for controlling the excitation of said generator and wherein energization of a pilot motor for operating said rheostat is controlled by a master controller having manually operated means for starting and a follow-up device for stopping said pilot motor, comprising means operable only when said master controller is in off position for disconnecting said rheostat from said source, a braking resistor, means operable in response to deenergization of said pilot motor for connecting said braking resistor to said pilot motor, and manual means for operating said generator field rheostat when said pilot motor is inoperative.

3. An electric power system wherein current is supplied to a motor from a direct current generator and wherein means arranged to be connected to a source of current are provided for controlling the field currents of said motor and said generator, comprising means for operating said field current control means, a master controller comprising manually operated means for starting and follow-up means for stopping said operating means, and means operable only when said master controller is in off position for disconnecting said field current control means from said source.

4. An electric ship propulsion system wherein current is supplied to a propeller motor from a generator provided with means for regulating its field excitation and wherein means for operating said field regulating means is controlled by a master controller having means for actuating and a follow-up device for deenergizing said operating means, comprising a switch for controlling the operation of said operating means, and interlocking means associated with said switch and said master controller to prevent operation of said switch when said actuating means and follow-up device are in a position to cause energization of said generator.

5. An electric ship propulsion system wherein current is supplied to a propeller motor from a generator provided with means for regulating its field excitation and wherein means for operating said field regulating means is controlled by a master controller having means for actuating and a follow-up device for deenergizing said operating means, comprising a switch for controlling the energization of said operating means, and oppositely disposed slotted members arranged to rotate with said actuating means and said follow-up device respectively, said switch having a part arranged to cooperate with the slots in said members to permit its operation only when said starting means and follow-up device are in a position to cause deenergization of the field of said generator.

In witness whereof, I have hereunto set my hand this tenth day of October, 1923.

GEORGE O. WATSON.